United States Patent
Higashizaki et al.

(10) Patent No.: US 8,673,488 B2
(45) Date of Patent: Mar. 18, 2014

(54) LITHIUM SECONDARY BATTERY

(76) Inventors: Tetsuya Higashizaki, Kyoto (JP); Toshinori Sugimoto, Kyoto (JP); Yuji Hoshihara, Kyoto (JP); Eriko Ishiko, Kyoto (JP)

( * ) Notice: Subject to any disclaimer, the term of this patent is extended or adjusted under 35 U.S.C. 154(b) by 0 days.

(21) Appl. No.: 13/456,803

(22) Filed: Apr. 26, 2012

(65) Prior Publication Data

US 2012/0270101 A1 Oct. 25, 2012
US 2013/0084489 A9 Apr. 4, 2013

Related U.S. Application Data

(63) Continuation of application No. PCT/JP2010/068841, filed on Oct. 25, 2010.

(30) Foreign Application Priority Data

Oct. 30, 2009 (JP) ................................. 2009-250568

(51) Int. Cl.
  *H01M 4/131* (2010.01)
  *H01M 10/056* (2010.01)
  *H01M 10/0525* (2010.01)

(52) U.S. Cl.
  USPC ...................................................... 429/188

(58) Field of Classification Search
  USPC .......................................... 429/188
  See application file for complete search history.

(56) References Cited

U.S. PATENT DOCUMENTS

| 2006/0134515 A1* | 6/2006 | Kumashiro et al. ........... 429/209 |
| 2007/0154809 A1* | 7/2007 | Wu et al. ....................... 429/221 |
| 2008/0096098 A1* | 4/2008 | Shirakata et al. ............... 429/94 |
| 2009/0170006 A1* | 7/2009 | Abe et al. ...................... 429/326 |

FOREIGN PATENT DOCUMENTS

| JP | 10-289733 A | 10/1998 |
| JP | 2009-32444 A | 2/2009 |

OTHER PUBLICATIONS

International Search Report for PCT/JP2010/068841 dated Jan. 25, 2011.

* cited by examiner

*Primary Examiner* — Karie O'Neill Apicella
(74) *Attorney, Agent, or Firm* — Roylance, Abrams, Berdo, & Goodman, L.L.P.

(57) ABSTRACT

A lithium ion secondary battery capable of charging in 15 minutes or less has a cathode with a composite layer on a surface of a collector having an active material and a conducting agent, an anode with an active material, an insulator between the cathode and anode, and an electrolyte with lithium ions. The cathode active material is represented by $Li_xMPO_4$, where M is a metal atom and $0<x<2$ and the conducting agent contains particles between 3 μm and 12 μm in size and in an amount of 1% or more by weight.

3 Claims, No Drawings

LITHIUM SECONDARY BATTERY

TECHNICAL FIELD

The present invention relates to a cathode for a lithium secondary battery and a lithium secondary battery using the same.

BACKGROUND ART

A lithium ion secondary battery is a small-sized and lightweight chargeable battery; is storage capacity per volume unit and weight unit is large; and is widely utilized in mobile phones, laptop personal computers, personal digital assistants, video cameras, digital cameras and the like, and is indispensable in each small-sized and lightweight mobile device having relatively large power consumption. From such characteristics, it is considered that the lithium ion secondary battery becomes key technology in storage battery technology as energy conservation and energy storage. Energy conservation includes application to vehicle-mounted uses such as electric vehicles (EV) and hybrid electric vehicles (HEV), and energy storage includes application to a fixed power source for efficient use of wind power generation, solar power generation and night power. In practical use of those uses, further high performance, high capacity and low cost are desired. On the other hand, in recent years, accident and recovery of lithium ion secondary battery occur one after another, and safety is emphasized. Thus, high reliability in the battery is strongly desired.

The most widespread cathode material of the lithium ion secondary battery is lithium cobaltate. The lithium cobaltate is a material having excellent performance, and is therefore used in many consumer equipments. However, since it is a rare metal, there are the problems such that it is expensive; change in the price is large; and safety is low. Other materials include lithium nickelate and lithium manganate. Although the lithium nickelate has high capacity and excellent high temperature cycle, it is poor in safety. Although the lithium manganate has the characteristics that safety such as overchargeability is excellent, and the price is low, capacity is low and high temperature cycle is inferior. Furthermore, a nickel-manganese-cobalt material is developed. This material can reduce cobalt, resulting in low cost, and safety is improved. For this reason, practical use of the material is progressing.

Under the above situation, olivine-type lithium oxides are low in environmental load and are rich as resources, and are therefore considered to be low cost material. Furthermore, the olivine-type lithium oxides have high capacity and excellent thermal stability at charging, and therefore can improve safety even in the emergency such as overcharge. Therefore, the olivine-type lithium oxides are expected as a cathode material (Patent Documents 1 to 3).

On the other hand, charging time of the lithium ion secondary battery is from about 1 to 5 hours, and very long time is required. For this reason, the demand to quick charge is increasing. Quick charge enables downsizing of equipments used, and can increase use frequency per unit time. This makes it possible to cut down an auxiliary battery and to decrease battery cost. To enable quick charge, Patent Document 4 proposes that an A/C ratio which is the ratio of an anode capacity A to a cathode capacity C is adjusted to from 1.1 to 1.6. In this invention, although quick charge characteristics are excellent, but quick charge/discharge cycle life is not clearly described.

In the case of conducting quick charge, large charging current must be flown through a lithium ion secondary battery, and speed of lithium ions inserted in an anode retards to charging rate. As a result, electrons on the anode react with lithium ions, and metallic lithium is precipitated on the anode. This greatly decreases battery performance and adversely affects safety. For this reason, quick charge in a short period of time of 15 minutes or less could not have conventionally been conducted.

Patent Document 1: JP-A 2002-216770
Patent Document 2: JP-A 2002-117902
Patent Document 3: JP-A 2002-117907
Patent Document 4: JP-A 2008-171661

DISCLOSURE OF THE INVENTION

Problems that the Invention is to Solve

The present invention has been made in view of the above, and has an object to provide a lithium ion secondary battery capable of completing charge in a short time of 15 minutes or less.

Means for Solving the Problems

A lithium ion secondary battery of the present invention is a lithium ion secondary battery comprising a cathode comprising a cathode composite layer on a surface of a cathode collector comprising a cathode active material and a conducting agent; an anode comprising an anode active material; a separator insulating between the positive and anodes; and an electrolyte comprising lithium ions and in order to solve the above problem, it is a lithium ion secondary battery wherein the cathode active material is represented by the following formula (I); the conducting agent contains particles having an average particle size of 3 μm or more and 12 μm or less in an amount of 1% by weight or more; a thickness of the cathode composite layer formed on the cathode collector is 50 μm or less per one surface; an electrode density of the anode is 1.55 g/cm³ or more; and an A/C ratio of a lithium capacity A that the anode can insert/desorb to a lithium capacity C that the cathode can insert/desorb is adjusted to 1.8≤A/C≤2.2:

(In the above (1), M is a metal atom containing at least one kind of metal atoms selected from the group consisting of Co, Ni, Fe, Mn, Cu, Mg, Zn, Ti, Al, Si, B and Mo, and 0<x<2).

In the lithium ion secondary battery, it is preferable that the cathode active material is LiFePO₄.

Furthermore, it is preferable that heating after first charge and an aging treatment repeating charge-discharge three times or more is carried out for the lithium ion secondary battery.

Effects of Invention

According to the lithium ion secondary battery of the present invention, the charging time can shorten from the conventional time of from about 1 to 5 hours to a time of 15 minutes or less. Furthermore, even though such quick charge is repeatedly carried out, life characteristics are excellent.

BEST MODE FOR CARRYING OUT THE INVENTION

1. Cathode Material

The cathode active material used in the present invention is represented by the following formula (I):

In the above (1), M is a metal atom containing at least one kind of metal atoms selected from the group consisting of Co, Ni, Fe, Mn, Cu, Mg, Zn, Ti, Al, Si, B and Mo, and $0<x<2$. Above all, the material in which M contains Fe is preferred, and $LiFePO_4$ is particularly preferred. Olivine $LiFePO_4$ has high theoretical capacity of 170 mAh/g, and is inexpensive, and therefore, the battery manufacturing cost can greatly be reduced. Furthermore, the olivine $LiFePO_4$ has excellent properties as a cathode material such that it has almost no toxicity to human body and environment; oxygen desorption is difficult to occur; and thermal stability is high. Therefore, it is preferred that the cathode active material is $LiFePO_4$ alone or mainly includes $LiFePO_4$.

Regarding raw materials of the cathode active material, Li source is Li salts such as $LiOH$, $Li_2CO_3$, $CH_3COOLi$ and $LiCl$; Fe source is Fe salts such as $FeC_2O_4$, $(CH_3COO)_2Fe$, $FeCl_2$ and $FeBr_2$; Mn source is Mn salts such as $MnCl_2$; Ni source is Ni salts such as $NiCl$; and Co source is $Co_3O_4$. In the case that M is other element, metal salts of each element can be used.

As P source, $H_3PO_4$, $(NH_4)_2HPO_4$, $NH_4H_2PO_4$ and the like can be used.

The cathode active material can be obtained by mixing those raw materials in a target molar ratio and burning the resulting mixture at high temperature.

Although particle size of the cathode active material is not particularly limited, an average particle size of primary particles is generally from about 10 nm to 100 μm, preferably from 30 to 250 nm from the point that electron conductivity is good, and more preferably from 60 to 200 nm. The average particle size of secondary particles is preferably 5 μm or less for the reasons that Brunauer-Emmett-Teller (hereinafter referred to as "BET") specific surface area can be made 10 $m^2/g$ or more, and a contact area between the cathode active material and a carbon material of the conducting agent can be made sufficiently large.

Although the above lithium-phosphorus oxide can directly be used, a cathode active material having low conductivity, such as $LiFePO_4$, can supplement electron conductivity by covering the surface of particles with carbon. The coating amount of carbon is preferably 0.5 part by weight or more and 10 parts by weight or less, per 100 parts by weight of the cathode active material.

2. Binder and Dispersion Medium

The binder can use any binder so long as it is a binder generally used in a lithium secondary battery. Examples of the binder include polyvinylidene fluoride (PVDF), polytetrafluoroethylene, polyvinyl chloride, polyvinyl pyrrolidone and mixtures of thereof. Among those, polyvinylidene fluoride can preferably be used.

The dispersion medium can use any dispersion medium so long as it is a dispersion medium generally used in a lithium secondary battery. Examples of the dispersion medium include N-methylpyrrolidone, toluene etc. Among those, N-methylpyrrolidone can preferably be used.

3. Conducting Agent

The conducting agent used in the present invention contains particles having an average particle size of 3 μm or more and 12 μm or less in an amount of 1% by weight or more. When the particles having an average particle size in the range are contained in a given amount, fluidity of paint is improved, and increase in viscosity can be suppressed. Furthermore, there are the effects of improvement of filling rate and binding property in a press process, and life of a battery can be prolonged. The average particle size can be measured by laser diffraction and scattering method.

Shape of the conducting agent may be any of spherical shape (granular shape), scale shape, fiber shape and the like. In the case of using scale shape, fiber shape or a mixture of those, filling rate and binding property are improved in a cathode press process, and defect such as peeling is difficult to occur, which is preferred.

The BET specific surface area of the conducting agent is preferably 8 $m^2/g$ or more and 30 $m^2/g$ or less. Where the BET specific surface area is less than 8 $m^2/g$, contact area to an active material is decreased, resulting in increase in impedance. Where the BET specific surface area exceeds 30 $m^2/g$, increase in viscosity of paint obtained becomes large, and coating becomes difficult.

As the conducting agent that can satisfy the above conditions, a conductive carbon material such as graphite or carbon fibers is preferably used. As the commercially available products, Graphite KS Series (KS4, KS6 and KS10) manufactured by Timcal, Graphite KS Series (SFGS6 and SFG10) manufactured by Timcal, carbon fibers (VGCF-H) manufactured by Showa Denko K.K., and the like can preferably be used.

The conducting agent can be used in one kind alone, and may be used as mixtures of two kinds or more.

The amount of the conducting agent used is preferably from 0.1 to 15 parts by weight in the total amount, per 100 parts by weight of the cathode active material.

In particular, when scale-like or fiber-like carbon material having an average particle size of from 3 to 10 μm is added in an amount of from 1 to 2 parts by weight per 100 parts by weight of the cathode active material, the effects of improvement of fluidity of paint, suppression of increase in viscosity, improvement of filling rate and binding property in press process, and the like become remarkable.

Furthermore, mixing a second conductive component of one kind or two kinds or more selected from the group consisting of conductive carbon materials having an average particle size of 1 μm or less is preferred in that filling rate and binding property can be improved in a cathode press process, and peeling and the like can become difficult to occur. The second conductive component is preferably that the BET specific surface area is 50 $m^2/g$ or more.

As the second conductive component, conductive carbon materials that have conventionally been used as a conducting agent, such as carbon black or acetylene black, can be used. As the commercially available products, carbon black (Super P) manufactured by Timcal, Ketjen Black (EC and EC600JD) manufactured by Lion Corporation, acetylene black (DENKA BLACK (registered trademark)) manufactured by Denki Kagaku Kogyo Kabushiki Kaisha, and the like can preferably be used.

4. Lithium Secondary Battery

The lithium secondary battery of the present invention is constituted of a cathode including the above-described cathode active material and conducting agent, an anode, and an electrolyte layer.

The cathode is obtained by mixing the cathode active material and the conducting agent component; adding the resulting powdery mixture to a binder to disperse the mixture in the binder; if necessary forming cathode paint diluted in a desired concentration; applying the paint obtained to a surface of a cathode collector such as an aluminum foil; and drying the coating. Thereafter, if necessary, a roll press treatment or the like is conducted so as to achieve a given press density.

Thickness of the cathode composite layer comprising the cathode active material and the conducting agent, which is formed on the surface of the cathode collector is preferably 50 μm or less per one surface in order to sufficiently maintain electron conductivity of the cathode composite layer itself even in charge and discharge at high rate electric current. The thickness of the cathode composite layer is particularly preferably a range of from 30 to 50 μm per one surface. Where the thickness of the cathode composite layer is too large, electron conductivity in a thickness direction of the cathode composite layer is decreased, which increases resistance. As a result, there is a concern that life characteristics are remarkably decreased in high rate charge-discharge. Where the thickness of the cathode composite layer is too small, the basis weight of the active material is decreased. As a result, weight of a battery or volume energy density is greatly decreased.

The anode is preferably one capable of inserting/desorbing metallic lithium or lithium ions, and the material constitution is not particularly limited. Conventional materials such as alloy, silicon and hard carbon can be used.

Specifically, an anode including a collector wherein a material obtained by mixing the anode active material and the binding agent is applied can be used.

As the anode active material, the conventional active materials can be used without particular limitation. Examples of the anode active material can include carbon materials such as natural graphite, artificial graphite, non-graphitizable carbon and graphitizable carbon; metal materials such as metallic lithium, alloy and tin compound; lithium transition metal nitrides, crystalline metal oxides, amorphous metal oxides, and conductive polymers.

As the binding agent, organic or inorganic binders can be used without particular limitation. The binding agents which are usable in the cathode, such as polyvinylidene fluoride (PVDF), can be used.

As the collector of the anode, foils obtained by processing copper, nickel or the like into net, punched metal, foamed metal or plate shape can be used.

The electrode density of the anode is 1.55 $g/cm^3$ or more, and preferably 1.65 $g/cm^3$ or more and 1.9 $g/cm^3$ or less. Where the electrode density is less than 1.55 $g/cm^3$, it becomes difficult to obtain a desired battery life. Where the electrode density is 1.9 $g/cm^3$ or more, the active material is densely filled by rolling, so that an electrolyte solution is difficult to impregnate, and lithium compound is easily precipitated. As a result, desired capacity and battery life cannot be obtained.

The electrolyte layer is a layer sandwiched between the cathode layer and the anode layer, and is a layer containing an electrolyte solution, a polymer wherein an electrolyte salt is dissolved, or a high molecular gel electrolyte. In the case of using the electrolyte solution or the high molecular gel electrolyte, a separator is desirably used. The separator plays a role of electrically insulating the cathode and the anode, and holding the electrolyte solution and the like.

The electrolyte solution can be an electrolyte solution used in the general lithium secondary battery, and includes general solutions such as an organic electrolyte solution and an ionic liquid.

Examples of the electrolyte salt include $LiPF_6$, $LiBF_4$, $LiClO_4$, $LiAsF_6$, $LiCl$, $LiBr$, $LiCF_3SO_3$, $LiN(CF_3SO_2)_2$, $LiC(CF_3SO_2)_3$, $LiI$, $LiAlCl_4$, $NaClO_4$, $NaBF_4$, $NaI$ etc., and particularly include inorganic lithium salts such as $LiPF_6$, $LiBF_4$, $LiClO_4$, and $LiAsF_6$, and organic lithium salts represented by $LiN(SO_2C_xF_{2x+1})(SO_2C_yF_{2y+1})$. Here, each of x and y is an integer of 0 or from 1 to 4, and x+y is from 2 to 8.

Examples of the organic lithium salts specifically include $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, and $LiN(SO_2C_2F_5)(SO_2C_4F_9)$.

Above all, when $LiPF_6$, $LiBF_4$, $LiN(CF_3SO_2)_2$, $LiN(SO_2F)_2$, $LiN(SO_2C_2F_5)_2$ or the like is used as the electrolyte, electric characteristics are excellent, which is preferable.

The electrolyte salt may be used in one kind, and may be used in two kinds or more.

Organic solvent wherein the electrolyte salt is dissolved is not particularly limited so long as it is an organic solvent used in a non-aqueous electrolyte solution of the general lithium secondary battery, and examples thereof include carbonate compounds, lactone compounds, ether compounds, sulfolane compounds, dioxalan compounds, ketone compounds, nitrile compounds, and halogenated hydrocarbon compounds. In detail, the examples include carbonates such as a dimethyl carbonate, a methyl ethyl carbonate, a diethyl carbonate, an ethylene carbonate, a propylene carbonate, an ethylene glycol dimethyl carbonate, a propylene glycol dimethyl carbonate, an ethylene glycol diethyl carbonate and a vinylene carbonate; lactones such as a γ-butyl lactone; ethers such as a dimethoxyethane, a tetrahydrofuran, a 2-methyl tetrahydrofuran, a tetrahydropyran and a 1,4-dioxane; sulfolanes such as sulfolane and 3-methylsulfolane; dioxolans such as 1,3-dioxolan; ketones such as 4-methyl-2-pentanone; nitriles such as acetonitrile, propyonitrile, valeronitrile and benzonitrile; halogenated hydrocarbons such as 1,2-dichloroethane; and ionic liquids such as methyl formate, dimethylformamide, diethylformamide, dimethylsulfoxide, imidazolium salt and quaternary ammonium salt. The electrolyte salt may be mixtures of thereof.

Among the organic solvents, particularly when at least one kind of a non-aqueous solvent selected from the group consisting of carbonates is contained, solubility of an electrolyte, dielectric constant and viscosity are excellent, which are preferable.

Examples of a high molecular compound used in a high molecular electrolyte or a high molecular gel electrolyte include polymers of ether, ester, siloxane, acrylonitrile, vinylidene fluoride, hexafluoropropylene, acrylate, methacrylate, styrene, vinyl acetate, vinyl chloride, oxetane or the like, high polymers having its copolymer structure, and its crosslinked body. The high polymers may be one kind and may be two kinds or more. Although the high molecular structure is not particularly limited, a high molecular polymer having an ether structure, such as polyethylene oxide, is particularly preferable.

In case of a liquid type battery, a electrolyte solution; and in case of a gel type battery, a precursor solution wherein a polymer is dissolved in an electrolyte solution; and in case of a solid electrolyte battery, a polymer before crosslinking wherein an electrolyte salt dissolved is poured into a battery container.

Regarding the separator, a separator used in the ordinary lithium secondary battery can be used without particular limitation, and examples thereof include a porous resin including polyethylene, polypropylene, polyolefin, polytetrafluoroethylene or the like; ceramics, and a non-woven fabric.

In the lithium ion battery of the present invention, the A/C ratio of a lithium capacity A that the anode can insert/desorb to a lithium capacity C that the cathode can insert/desorb is adjusted to $1.8 \leq A/C \leq 2.2$. When the A/C ratio is less than 1.8, normal insertion in the anode is not carried out in case of charging at high rate current, and lithium metal is precipitated. In the case where the lithium metal is precipitated, battery life is remarkably decreased, and additionally, the lithium metal changed into a dentrite shape may penetrate through the separator, leading to short circuit. On the other hand, where the A/C ratio exceeds 2.2, the weight of the anode is increased, and as a result, energy density of the battery is greatly decreased.

The A/C ratio can be adjusted by adjusting the weight of the cathode active material and the weight of the anode active material. More specifically, in applying an electrode material, the electrode material is applied with changing such that the cathode and anode active material weights per unit area becomes a given amount to obtain electrodes. The electrodes are combined based on the setting to obtain a battery. The calculation formula of the A/C ratio is as follows.

A/C ratio=(Lithium capacity capable of inserting/desorbing per anode active material weight×active material weight per anode unit area)/((Lithium capacity capable of inserting/desorbing per cathode active material weight×active material weight per cathode unit area)

5. Aging Treatment

In the production of the lithium ion secondary battery of the present invention, discharge capacity can be increased by carrying out heating after the first charge and an aging treatment repeating charge-discharge three times or more. The heating is preferably conducted at from about 40 to 50° C.

EXAMPLES

Although the present invention is described in more detail below by reference to Examples, it should be understood that the invention is not construed as being limited to the Examples.

[Preparation of Cathode]

After dry mixing by a mixer of 90 g of a cathode active material $LiFePO_4$ (including covering carbon), 1 g of Graphite KS Series SFG6 (average particle size is 3 μm or more, and BET specific surface ratio is 30 m²/g or less) manufactured by Timcal as a conducting agent 1, and 3 g of Carbon Black Super P (average particle size is 1 μm or more, and BET specific surface ratio is 50 m²/g or more) manufactured by Timcal as a conducting agent 2, namely, total 4 g as the conducting agent, the resulting powder mixture was added to 54 g (6 g as solid content) of PVDF (KF Binder #9130 manufactured by Kureha Corporation, NMP 13 wt % solution) as a binder, and dispersed therein by a planetary mixer. Additionally, 100 g of N-methyl-2-pyrrolidone was added for dilution to make the solid content 40 wt %. Thus, a cathode paint was obtained. The paint obtained was applied to an aluminum foil (thickness: 15 μm) and dried with hot air. A cathode of a cathode active material was obtained so as to achieve a given application weight. Furthermore, after drying at 130° C. under reduced pressure, roll press treatment was conducted so as to achieve a given press density.

[Preparation of Anode]

By a mixer, 90 g of graphite as an anode active material and 2 g of acetylene black as a conducting agent were dry mixed. For dilution, The resulting powder mixture was added to 62 g (8 g as solid content) of PVDF (KF Binder #9130 manufactured by Kureha Corporation, NMP 13 wt % solution) as a binder, and dispersed therein by a planetary mixer. 45 g of N-methyl-2-pyrrolidone was further added to make the solid content 50 wt %. Thus, an anode paint was obtained.

Additionally, the obtained paint was applied to an electrolytic copper foil (thickness: 10 μm) and dried with hot air. An anode of an anode active material was obtained so as to achieve a given application weight. Furthermore, after drying at 130° C. under reduced pressure, roll press treatment was conducted such that genitive electrode density becomes a given press density.

[Preparation of Lithium Secondary Battery]

CELGARD #2325 (manufactured by Celgrad) as a separator was interposed between the cathode and anode obtained above to laminate those, and a cathode terminal and an anode terminal were ultrasonic-welded to the respective positive and anodes. The resulting laminate was placed in an aluminum laminate packing material, and the packing material was heat-sealed except for an opening for injecting a liquid. Thus, a battery before injecting a liquid, having a cathode area of 18 cm² and an anode area of 19.8 cm² was prepared. An electrolyte solution obtained by dissolving $LiPF_6$ in a mixed solvent of ethylene carbonate and diethyl carbonate was injected, and the opening was heat-sealed. Thus, a battery for evaluation was obtained.

A/C ratio which is a ratio of a lithium capacity A that the anode used for evaluation can insert/desorb to a lithium capacity C that the cathode can insert/desorb was changed in a range of from 1.1 to 2.2. The anode density was changed in a range of from 1.2 to 1.7 g/cm³.

Quick charge cycle was evaluated from volume retention when CCCV charge and CC discharge were repeatedly cycled at 5 C current value. The results are shown in Tables 1 and 2. The 5 C current value is charge-discharge at current value of five times of the current value 1 C capable of discharge cell volume for 1 hour, and indicates that charge and discharge are performed in about 12 minutes.

TABLE 1

| | Cathode active material | Conducting agent 1 Average particle size: 3 μm or more | Conducting agent 2 Average particle size: 1 μm or less | Compositional ratio (weight ratio) Active material/ (conducting agents 1 + 2)/binding agent | Cathode composite layer One surface thickness | A/C ratio | Anode density g/cm³ | 5C charge-discharge 500 cycles retention % | 5C charge-discharge 1,000 cycles retention % |
|---|---|---|---|---|---|---|---|---|---|
| Example 1 | $LiFePO_4$ | SFG6 | Super P | 90/(1 + 3)/6 | 40 | 2.2 | 1.70 | 92 | 89 |
| Example 2 | | | | | 40 | 2.0 | 1.70 | 93 | 90 |
| Example 3 | | | | | 40 | 1.8 | 1.70 | 87 | 82 |
| Comparative Example 1 | | | | | 40 | 1.6 | 1.70 | 79 | 67 |
| Comparative Example 2 | | | | | 40 | 1.4 | 1.70 | 67 | 52 |
| Comparative Example 3 | | | | | 40 | 1.1 | 1.70 | 22 | — |
| Example 4 | $LiFePO_4$ | SFG6 | Super P | 90/(1 + 3)/6 | 40 | 2.0 | 1.70 | 92 | 88 |
| Example 5 | | | | | 40 | 2.0 | 1.65 | 89 | 81 |
| Example 6 | | | | | 40 | 2.0 | 1.55 | 85 | 77 |

TABLE 1-continued

| | Cathode active material | Conducting agent 1 Average particle size: 3 μm or more | Conducting agent 2 Average particle size: 1 μm or less | Compositional ratio (weight ratio) Active material/ (conducting agents 1 + 2)/binding agent | Cathode composite layer One surface thickness | A/C ratio | Anode density g/cm³ | 5C charge-discharge 500 cycles retention % | 5C charge-discharge 1,000 cycles retention % |
|---|---|---|---|---|---|---|---|---|---|
| Comparative Example 4 | | | | | 40 | 2.0 | 1.40 | 55 | 36 |
| Comparative Example 5 | | | | | 40 | 2.0 | 1.28 | 52 | 19 |
| Comparative Example 6 | | | | | 40 | 2.0 | 1.22 | 51 | 21 |

TABLE 2

| | Cathode active material | Conducting agent 1 Average particle size: 3 μm or more | Conducting agent 2 Average particle size: 1 μm or less | Compositional ratio (weight ratio) Active material/ (conducting agents 1 + 2)/binding agent | Cathode composite layer One surface thickness | A/C ratio | Anode density g/cm³ | 5C charge-discharge 500 cycles retention % | 5C charge-discharge 1,000 cycles retention % |
|---|---|---|---|---|---|---|---|---|---|
| Example 7 | LiFePO₄ | SFG6 | Super P | 90/(1 + 3)/6 | 30 | 2.0 | 1.70 | 94 | 92 |
| Example 8 | | | | | 40 | 2.0 | 1.70 | 92 | 89 |
| Example 9 | | | | | 50 | 2.0 | 1.70 | 86 | 79 |
| Comparative Example 7 | | | | | 60 | 2.0 | 1.70 | <30 | |
| Comparative Example 8 | | | | | 70 | 2.0 | 1.70 | <20 | |
| Comparative Example 9 | LiFePO₄ | | Super P | 90/(0 + 4)/6 | 40 | 2.0 | 1.70 | 68 | 51 |

[Aging Treatment Method of Lithium Secondary Battery]

After preparation of the lithium ion secondary battery, discharge capacity per cathode weight when heating and charge-discharge aging were applied was evaluated. Namely, after the first charge, the aging treatment under the environments at 20° C., 40° C. or 50° C. for 24 hours, and aging treatment of 3 cycles of 1 C charge-discharge were carried out. After the aging treatments, the batteries were once opened, degassing was conducted under reduced pressure, and the batteries were again heat-sealed. The results are shown in Table 3.

TABLE 3

| | Aging treatment after first charge | Discharge capacity mAh/g |
|---|---|---|
| Example 10 | 40° C. × 24 hours | 129 |
| Example 11 | 50° C. × 24 hours | 128 |
| Example 12 | 40° C. × 24 hours, 1 C charge-discharge 3 cycles | 131 |
| Example 13 | 50° C. × 24 hours, 1 C charge-discharge 3 cycles | 130 |
| Comparative Example 10 | 20° C. × 24 hours | 122 |
| Comparative Example 11 | 20° C. × 24 hours, 1 C charge-discharge 3 cycles | 124 |

As shown in Table 3, by carrying out the heat aging at an environmental temperature of from about 40 to 50° C. and then charge-discharge cycle of 3 cycles or more at 1 C current value, discharge capacity is increased in comparison with the case that the above operations are not carried out.

INDUSTRIAL APPLICABILITY

The cathode of a lithium secondary battery of the present invention is useful in a middle-sized or large-sized lithium secondary battery mounted as not only a power source of mobile devices, but a power source of electric bicycles, electric wheelchairs, robots and electric vehicles; an emergency power source, and a large capacity stationary power source.

The invention claimed is:

1. A lithium ion secondary battery comprising:
    a cathode including a cathode composite layer on a surface of a cathode collector having a cathode active material and a conducting agent;
    an anode including an anode active material;
    a separator disposed between said cathode and said anode; and
    an electrolyte including lithium ions, wherein said cathode active material is represented by the following formula (I), said conducting agent contains particles having an average particle size of 3 μm or more and 12 μm or less in an amount of 1% by weight or more, a thickness of said cathode composite layer formed on said cathode collector is 50 μm or less per one surface and an electrode density of said anode is 1.55 g/cm³ or more and an A/C ratio of a lithium capacity A that the anode can insert/desorb to a lithium capacity C that the cathode can insert/desorb is greater than or equal to 1.8 and less than or equal to 2.2:

$$Li_xMPO_4 \qquad (I)$$

wherein M is a metal atom containing at least one kind of metal atoms selected from the group consisting of Co, Ni, Fe, Mn, Cu, Mg, Zn, Ti, Al, Si, B and Mo, and 0<x<2.

2. The lithium ion secondary battery according to claim 1, wherein the cathode active material is LiFePO₄.

3. The lithium ion secondary battery according to claim 1 or 2, wherein said lithium ion secondary battery is heated after it is charged for the first time and an aging treatment process is performed on said lithium ion secondary battery during which said lithium ion secondary battery is repeatedly charged and discharged at least three times.

* * * * *